Patented Sept. 22, 1942

2,296,618

UNITED STATES PATENT OFFICE 2,296,618

SILICATE TREATED TITANIUM PIGMENT

Gordon D. Patterson, Wilmington, Del., assignor to E. I. du Pont de Nemours & Company, Wilmington, Del., a corporation of Delaware No Drawing. Application February 2, 1939, Serial No. 254,160

7 Claims. (Cl. 106—300)

The present invention relates to titanium oxide pigments and particularly to a process for treating said pigments and to products produced by this process which when used in coating compositions impart resistance to discoloration in the light and also give improved weathering characteristics.

The use of titanium pigments and their application has been greatly limited in the prior art due to the tendency of coating compositions into which such pigments have been incorporated to discolor when exposed to light. The initial brilliance and whiteness of such coating compositions would therefore disappear shortly after their application. This defect of discoloration became even more noticeable after a number of improvements in the pigmenting power and initial color of coating compositions were made. In certain types of coatings it even became necessary, due to this lack of color stability, to employ other pigments of lower pigmenting power. The consequence of this was a sacrifice in the opacity of the coating compositions.

It is an object of the present invention to produce improved titanium pigments. A further object is to treat titanium pigments in such a manner that the treated pigments when used in coating compositions will impart to said compositions greater stability against heat and light. A still further object is the production of titanium pigments which have greater weathering resistance, especially when such pigments are used in paint compositions. A still further object is the treatment of titanium oxide pigments in order that said pigments will impart color stability to paint compositions intended for exterior and interior application. Additional objects will become apparent from a consideration of the following description and claims.

Broadly this invention pertains to a process for treating a pigment, which comprises associating with the pigment in a water medium a white relatively insoluble silicate compound in the form of a wet precipitate formed by the reaction in a water medium of a soluble silicate with a soluble second group metal compound.

In a more restricted sense this invention comprises adding a water soluble silicate to a pigment slurry. I have found it desirable to agitate this slurry thereby assuring uniform distribution of the silicate in the pigment slurry. A soluble compound of a second group metal is then added to this slurry thereby precipitating the silicate with the pigment. The treated pigment is then filtered, washed, dried, disintegrated, or dry ground, and handled in any manner customary for the final finishing of the dried pigment.

The preferred embodiment of this invention comprises preparing a slurry of a calcined titanium oxide pigment, and when necessary, grinding such slurry, by some suitable known means in order to insure a uniform slurry free from agglomerates. To this slurry is then added between about 0.5% to about 10%, based on the titanium oxide, of a water soluble alkali metal silicate, preferably sodium silicate. A soluble compound of a second group metal, preferably a solution of barium chloride or a solution of zinc sulfate, is then added to the slurry. Generally, the soluble metal salt which is added is in an amount chemically equivalent to the soluble silicate used. During the addition of the metal salt the pigment slurry is constantly stirred. The treated pigment is then filtered, washed, dried, disintegrated or dry ground, and handled in any manner customary for the final finishing of the dried pigment. If desired the pigment to be treated may be slurred in a solution of the soluble salt of the second group metal and the soluble silicate added or the silicate may be precipitated separately and the wet precipitate slurried with the pigment.

The amount of precipitated silicate associated with the pigment is largely determined by the specific use for which the pigment is intended. However, for most commercial purposes a titanium oxide pigment having between a fraction of 1% and about 10% and preferably about 5% of the silicate precipitate associated therewith has been found satisfactory, and sufficient to markedly improve resistance to yellowing. Even larger amounts may be used if desired, e. g. to serve as an extender, without loss of advantage so far as yellowing is concerned.

The following examples are given for illustrative purposes, and are not intended to place any restrictions or limitations on the herein described invention.

Example I

Five hundred parts of a commercial grade of calcined titanium oxide was slurried in 1500 parts of water by high speed agitation and to this slurry was added a solution containing 10.16 parts of sodium metasilicate ($Na_2SiO_3$). The slurry was then thoroughly agitated to insure uniform distribution of the silicate in the pigment slurry. If the titanium oxide pigment is at all gritty it is desirable to grind the pigment slurry by some suitable means such as a colloid or pebble mill to insure a uniform slurry free from pigment agglomerates. A barium chloride solution containing 17.34 parts of BaCl₂, an amount chemically equivalent to the sodium silicate content, was then slowly added to the slurry with constant stirring. The slurry was then filtered and the pigment washed to remove sodium chloride. The pigment was then dried and dry ground after which it was ready for use.

Barium silicate has a slight solubility and also may be somewhat hydrolyzed during washing. In order to keep hydrolysis at a minimum, a minimum of cold water was used in washing the pigment. If it is assumed that all the barium silicate was retained by the pigment the barium silicate content is 3.55% on the basis of the titanium oxide.

This pigment was used in formulating a white baking enamel based on a polybasic acid-polyhydric alcohol resin and evaluated for color stability by indoor exposure in a well lighted room. After an exposure period of almost two years, the enamel which contained the treated pigment was relatively free of discoloration, whereas a duplicate product formulated with untreated titanium oxide was very badly discolored to a yellowish or yellowish brown tint.

Treatments with other silicates, such as those of magnesium, calcium, strontium, cadmium and zinc are made in the same manner as described above for barium silicate, and with similar result.

Example II

This example illustrates a treatment in which the sodium silicate used was a commercial solution in which the molecular ratio of $Na_2O$ to $SiO_2$ was approximately 1:3.8.

Three hundred grams of a commercial grade of calcined titanium oxide pigment was slurried in 1000 cc. of water and ground in a colloid mill to give a uniform slurry free from agglomerated pigment particles. To this slurry was then added 60 grams of sodium silicate solution containing 6.2% $Na_2O$ and 23.5% $SiO_2$. In order to facilitate mixing, the silicate solution was diluted with about 100 cc. of water before being added to the slurry. After thorough stirring of the slurry, a 10% solution of zinc sulfate was then slowly added with constant, vigorous stirring until the slurry had a pH of approximately 7.6. The pigment slurry was filtered and the pigment washed, after which it was dried, dry ground and was then ready for use. The amount of zinc sulfate added was equivalent to 5.25 grams of ZnO representing 1.75% ZnO (combined as zinc silicate) on the basis of $TiO_2$ treated. The amount of zinc sulfate was approximately chemically equivalent to the $Na_2O$ content of the sodium silicate.

A pigment prepared according to the above example was evaluated in the same manner as described for the treated pigment of Example I. The enamel prepared from this pigment was also found to be very resistant to discoloration in the light and was far superior in this respect to a similar enamel prepared using untreated titanium oxide.

Treatments can be made in the same manner using soluble salts of magnesium, calcium, strontium, barium and cadmium, etc., instead of the zinc salt used in the above example. In the above example the pH of the slurry was used in order to determine the amount of zinc sulfate which was to be added. If the pH of the slurry is used to determine the amount of salt to be added, it may be advantageous to determine experimentally the pH of the slurry at which sodium silicate and the metal salt are present in chemically equivalent amounts. In most cases, however, the amount of soluble metal salt which is added is in an amount chemically equivalent to the amount of sodium silicate used.

In carrying out the treatments in which various silicates are precipitated on the pigment particles, the ratio of metal oxide to silicon dioxide in the precipitated silicate may not necessarily be the same because of variations in the degree to which various silicates are hydrolyzed. There may also be a variation in the composition of the precipitated silicate from batch to batch if certain operating conditions, such as temperature of slurry, extent of washing, temperature of wash water, etc., are varied.

It will be noted that in the above examples the sodium silicate was first added to the pigment slurry followed by the addition of the soluble salt of the desired metal. This procedure has been used because of operating advantages. Sodium silicate has a dispersing effect on the pigment and when such a slurry is ground a well dispersed pigment suspension is obtained. When the salt of the precipitating metal is then added the pigment is flocculated and can be readily filtered and washed.

Furthermore, it is also very convenient to combine this treatment procedure with the pigment grinding and elutriation processes described in U. S. Patents 1,937,037 and 2,044,941, in which sodium silicate is one of the substances used as a deflocculating agent for titanium pigments. After the pigment has been ground and elutriated a soluble salt of the desired metal is added which causes precipitation of the silicate and consequent flocculation of the pigment, thereby advantageously combining the treatment process with the flocculation, filtering and washing process, normally applied in the finishing of the pigment. A larger amount of agent is usually required than is represented by the optimum amount of sodium silicate required for the elutriation process and more sodium silicate is then added to the elutriated slurry before the addition of the precipitating salt. The above description is not intended to limit the precipitation of the silicate on the pigment to the above procedure but merely to indicate how the process can be combined with the grinding and elutriation steps in the finishing process. The treatment can, of course, be made by first adding the second group metal salt to the pigment slurry followed by the sodium silicate.

As stated above, it is not essential that the silicate be precipitated in the presence of the titanium oxide, although this procedure is preferred because it results in a much more uniform and intimate association of the agent with the pigment. The silicate can be separately prepared by the addition of the second group metal salt to a suitable solution of water-soluble silicate, thereby precipitating the silicate separately and apart from the titanium oxide pigment. The silicate can then be washed before blending with the pigment. This precipitated silicate, however, should not be dried but a water slurry of the silicate should be blended with a water slurry of the titanium oxide pigment.

While the invention has been described with particular application to the treatment of pigment titanium dioxide, the treatment of other types of titanium pigments is contemplated. Accordingly, the term "titanium pigment" as employed herein and in the appended claims includes not only titanium dioxide, but also such pigment materials as titanates of divalent metals and titanium dioxide extended with various extender materials such as barium sulfate, calcium sulfate, naturally occurring silicates, silica, etc. It is further to be understood that the titanium oxygen compounds employed in my invention have had their pigment properties developed by calcination or other treatment, as by the process of U. S. Patent 2,046,054. Furthermore, in the case of such pigments as titanium dioxide, which are calcined during the process of manufacture of said pigments, the treating agent is added to the calcined pigment and not to the pigment before the calcination operation, i. e. it is to be understood that the pigment should not be calcined after addition of the treating agent.

As stated above, the amount of treating agent associated with the pigment is largely determined by the specific use for which the pigment is intended. It is desirable, however, except in special cases, to limit the amount of silicate to an amount which is required to produce the desired improvement, as further addition of silicate dilutes the pigment, decreases its covering power and influences other properties such as oil absorption and gloss of the coating compositions in which it is used.

It is essential to the present invention that the silicate compound be precipitated on or slurried with the titanium pigment. Moreover, the precipitate must not be dried before it is slurried with the pigment, but at the time it is slurried with the titanium pigment it should still possess its hydrated gelatinous character.

As illustrative of the improvements obtained by the use of the pigment of Example I the following data are cited. Indoor exposures of baked enamels based on an oil modified polyhydric alcohol-polybasic acid resin pigmented in one case with the pigment of Example I and in the other with an untreated titanium oxide control were made in a well lighted room and after 19 months the enamel containing the treated pigment showed substantially no discoloration, whereas the enamel containing the unmodified titanium oxide had badly discolored. The magnitude of difference expressed on an arbitrary scale in which each unit represented a definite visual difference in color was of the order of 12 units.

The examples given illustrate treatments in which relatively small amounts of the treating agents are precipitated with the titanium oxide pigment. Such treatments in which relatively small amounts of the silicate are precipitated with the titanium oxide are particularly effective in stabilization of the pigment against discoloration in the light when used in coating compositions. It is also desirable to use the minimum amount of treating agent required to give the desired color stabilizing effect in order to minimize as much as possible the effect on other pigment properties. Resistance against yellowing is particularly advantageous when the pigments are used in compositions which are employed indoors where color changes are most noticeable and also most objectionable.

The pigment materials produced according to the herein described invention are coated with an insoluble silicate of a divalent metal. Treated pigments of the type described in this invention are also useful in paint compositions which are exposed to the weather as such treated pigments when used in outdoor paints impart increased weathering resistance over similar compositions containing untreated pigments. For such applications a larger amount of the agent than would be customarily used to impart color stability is usually desirable. For improved weathering resistance the silicates of barium, cadmium, and zinc, are preferred over the silicates of the other second group metals.

The various uses for pigments treated according to the present invention are obvious. By the application of the treating process described herein the tendency to discolor in the light can be greatly minimized thereby increasing the variety and scope of application of titanium pigments. By the use of the titanium pigments treated according to this invention, full advantage can be taken of the high opacifying power of the titanium pigments without a sacrifice in the color stability of the coating material.

As many apparently widely different embodiments of this invention may be made without departing from the spirit and scope thereof, it is to be understood that I do not limit myself to the specific embodiment except as defined in the appended claims.

Having disclosed the herein described invention, the following is claimed as new and useful:

1. A process for treating a titanium dioxide pigment which comprises mixing with an aqueous slurry of said pigment about 1% to 10%, based on the weight of the pigment, of an alkali metal silicate, and thereafter adding to the slurry as a precipitant barium chloride thereby precipitating an insoluble silicate in the presence of the pigment.

2. An improved pigment which comprises titanium dioxide and the reaction product of an alkali metal silicate and barium chloride.

3. A process for treating a titanium dioxide pigment which comprises mixing with an aqueous slurry of the previously calcined pigment about .5% to 10%, based on the weight of the pigment, of sodium silicate, thereafter incorporating barium chloride as a precipitant in the slurry mixture to precipitate an insoluble silicate on said pigment, and then recovering and drying the resulting product.

4. An improved pigment which comprises titanium dioxide and from about .5% to 10%, based on the weight of the titanium dioxide, of the reaction product of an alkali metal silicate and barium chloride.

5. An improved pigment which comprises previously calcined titanium dioxide and the reaction product of sodium silicate and barium chloride.

6. An improved pigment which comprises previously calcined titanium dioxide having intimately associated therewith from about .5% to about 10% of the reaction product of sodium silicate and barium chloride, said percentage amount being based on the titanium dioxide.

7. An improved pigment which comprises previously calcined titanium dioxide and in intimate association therewith about 5% of the reaction product of sodium silicate and barium chloride, said percentage amount being based on the titanium dioxide.

GORDON D. PATTERSON.